UNITED STATES PATENT OFFICE.

RICHARD KIRCHHOFF AND EMIL HAUSSMANN, OF BERLIN, GERMANY, ASSIGNORS TO THE ACTIEN-GESELLSCHAFT FÜR ANILIN FABRIKATION, OF SAME PLACE.

BLACK SULFUR DYE.

SPECIFICATION forming part of Letters Patent No. 647,847, dated April 17, 1900.

Application filed January 9, 1900. Serial No. 870. (No specimens.)

*To all whom it may concern:*

Be it known that we, RICHARD KIRCHHOFF and EMIL HAUSSMANN, of Berlin, in the Kingdom of Prussia, German Empire, have invented new and useful Improvements in the Production of Black Dye; and we do hereby declare that the following is a full, clear, and exact description of the invention, which will enable others skilled in the art to which it appertains to make and use the same.

In United States Letters Patent Nos. 610,541 and 625,717 there is described a black coloring-matter directly dyeing cotton which has since been brought upon the market under the name of "immedial-black." The dye is produced by melting with sulfur and sulfids of alkali metals dinitrooxydiphenylamin:

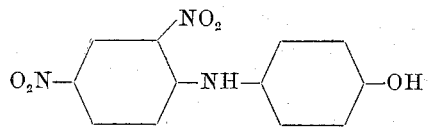

the dried and powdered melt dyeing unmordanted cotton deep black tints without requiring a subsequent oxidation.

We have now made the discovery that by allowing sulfur and sulfids of alkali metals to act on equimolecular mixtures of dinitrooxydiphenylamin and picramic acid a new coloring-matter is formed which dyes unmordanted cotton deep-black shades. It might have been expected that the reaction would lead to a mixture of immedial-black and of a dyestuff deriving from picramic acid; but the properties of our new product being essentially different from those of the two dyestuffs above mentioned there is no doubt that a new product has been formed which contains the residue as well of picramic acid as of dinitrooxydiphenylamin. In compliance with this supposition it has been found impossible to arrive at our new product by mixing in various proportions the dyestuffs obtained by treatment with sulfur and sulfids of alkalies from picramic acid and from dinitrooxydiphenylamin.

To further illustrate our invention, we give the following examples: One hundred and seventy kilos of sodium sulfid, sixty kilos of sulfur, and fifteen kilos of water are melted together, and a mixture of twenty kilos of dinitrooxydiphenylamin and 14.3 kilos of picramic acid is added thereto at about 100° centigrade. The formation of the coloring-matter begins after a short time, and it is completed by slowly raising the temperature and maintaining it at least for several hours at 145°.

The dyestuff can be rendered ready for technical use by several methods: Either the melt is heated up to a somewhat more elevated temperature until it is perfectly dry (it is then powdered and may be directly employed for dyeing) or the melt is dissolved in water and the dyestuff is precipitated from the solution obtained by addition of common salt or of mineral acids or by the introduction of a current of air or of carbonic acid. The blue precipitate thus produced is filtered and pressed. The pressed cake is melted together with sodium sulfid on the water-bath, and the thick mass is brought to dryness by allowing it to stand in the dry-room or by evaporation on the water-bath. The dyestuff isolated by one of these methods dissolves in water with deep-blue-black coloration, which on addition of caustic-soda lye turns dark blue. From its aqueous solution the dyestuff is precipitated by means of common salt in the shape of a green-black powder. It is likewise precipitated by mineral acids or acetic acid. It is insoluble in alcohol and hardly soluble in concentrated sulfuric acid in the cold. On heating the dyestuff with this latter agent it dissolves, forming a dark-blue solution, which on addition of ice-water yields a black-violet precipitate.

The dyestuff dissolves in fuming sulfuric acid of twenty-five per cent. $SO_3$ with black-violet coloration. From this solution a black-violet powder separates on addition of ice. On heating the aqueous solution of the dyestuff with caustic-soda lye and zinc-dust the color disappears. On exposure to air, however, the colorless solution thus obtained assumes again the dark-blue color of the original solution. The coloring-matter dyes unmordanted cotton deep-black shades.

The same dyestuff can likewise be obtained if in the preceding example for picramic acid the equimolecular quantity of picric acid is substituted, picramic acid being produced, as is well known, by the action of sulfids of alkali metals on picric acid during the melting process.

Having thus described our invention and in what manner the same can be performed, what we claim as new is—

The black dye produced by melting with sulfur and sulfids of alkali metals an equimolecular mixture of picramic acid and dinitroöxydiphenylamin:

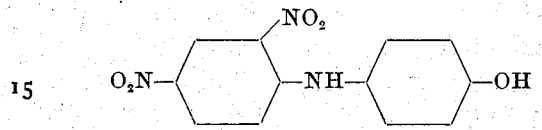

said dye being insoluble in alcohol, easily soluble in water forming a blue-black solution which on addition of caustic-soda lye turns dark blue, the dye being precipitated from its aqueous solution by means of common salt or mineral acids or acetic acid or by a current of air or carbonic acid in the shape of a green-black powder; being soluble in hot concentrated sulfuric acid with dark-blue coloration, in fuming sulfuric acid of twenty-five per cent. $SO_3$ with black-violet coloration, both solutions yielding black-violet precipitates on addition of ice or ice-water; forming on reduction with zinc-dust and caustic-soda lye a colorless solution which on exposure to air assumes the orignal dark-blue color of the dyestuff; the new coloring-matter dyeing unmordanted cotton from a bath containing common salt deep-black shades.

In witness whereof we have hereunto signed our names, this 21st day of December, 1899, in the presence of two subscribing witnesses.

RICHARD KIRCHHOFF.
EMIL HAUSSMANN.

Witnesses:
HENRY HASPER,
WOLDEMAR HAUPT.